United States Patent [19]
Louis et al.

[11] Patent Number: 5,325,178
[45] Date of Patent: Jun. 28, 1994

[54] METHOD OF MEASURING THE DIMENSIONS OF MOVING OBJECTS

[75] Inventors: Bernard Louis, Liancourt; Bernard Bichot, Clermont, both of France

[73] Assignee: Isover Saint-Gobain, Courbevoie, France

[21] Appl. No.: 863,073

[22] Filed: Apr. 3, 1992

[30] Foreign Application Priority Data

Apr. 18, 1991 [FR] France .............................. 91 04775

[51] Int. Cl.$^5$ ............................................. G01B 11/04
[52] U.S. Cl. ................................... 356/381; 250/560; 356/383; 356/385
[58] Field of Search ............... 356/372, 381, 383, 384, 356/385; 250/560

[56] References Cited

U.S. PATENT DOCUMENTS 4,899,061 2/1990 Van Hoek et al. .................. 356/381
4,942,539 7/1990 McGee et al. ....................... 364/513

FOREIGN PATENT DOCUMENTS 0029748 6/1981 European Pat. Off. .

*Primary Examiner*—F. L. Evans
*Attorney, Agent, or Firm*—Oblon, Spivak, McClelland, Maier & Neustadt

[57] ABSTRACT

An optical method continuously monitors the dimensions of a body having a parallelogram cross-section and supported on a moving conveyor. A first angular measurement of a first dimension of a first face of the body in a first direction is first performed, the first angular measurement being made with respect to a first reference angle at an apex of a first triangular plane having the first dimension as one side thereof. Substantially simultaneously with the step of determining the first angular measurement, a second angular measurement of a second dimension of a second face of the body in a second direction perpendicular to the first direction is determined, the second face intersecting the first face and the second angular measurement being made with respect to a second reference angle at an apex of a second triangular plane coplanar with the first triangular plane and having a second dimension as one side thereof. The first and second dimensions thus have a common point at a line of intersection of the first and second faces. The position of the common point with respect to one of the first and second directions is then estimated and an iterative process is used to determine the position of the common point. The iterative process is continued until the position of the common point is determined to within a required accuracy in both of the first and second directions.

13 Claims, 4 Drawing Sheets

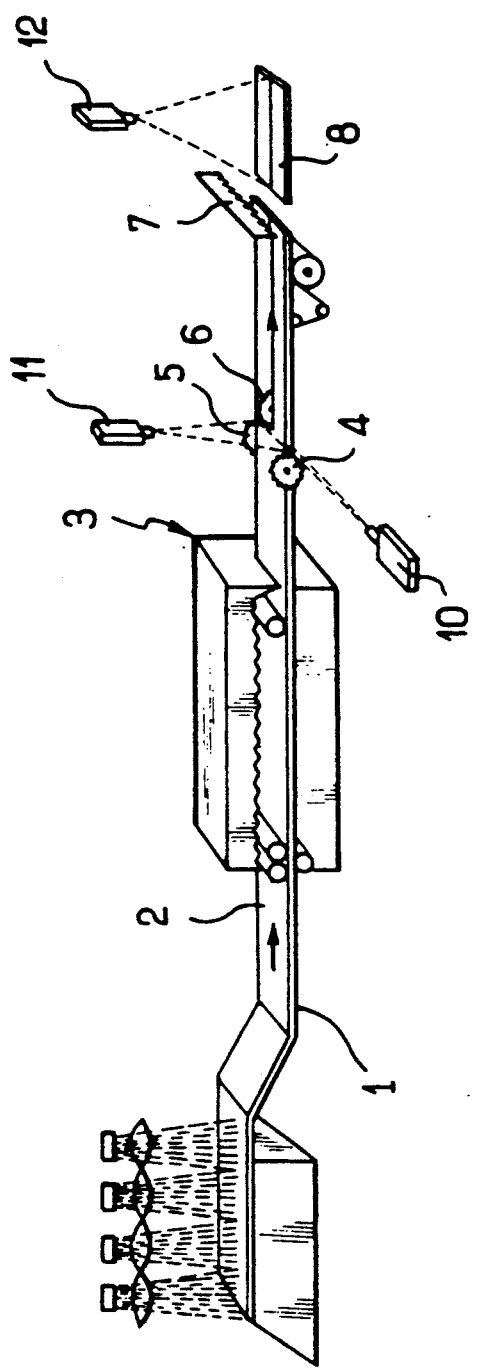
FIG_1

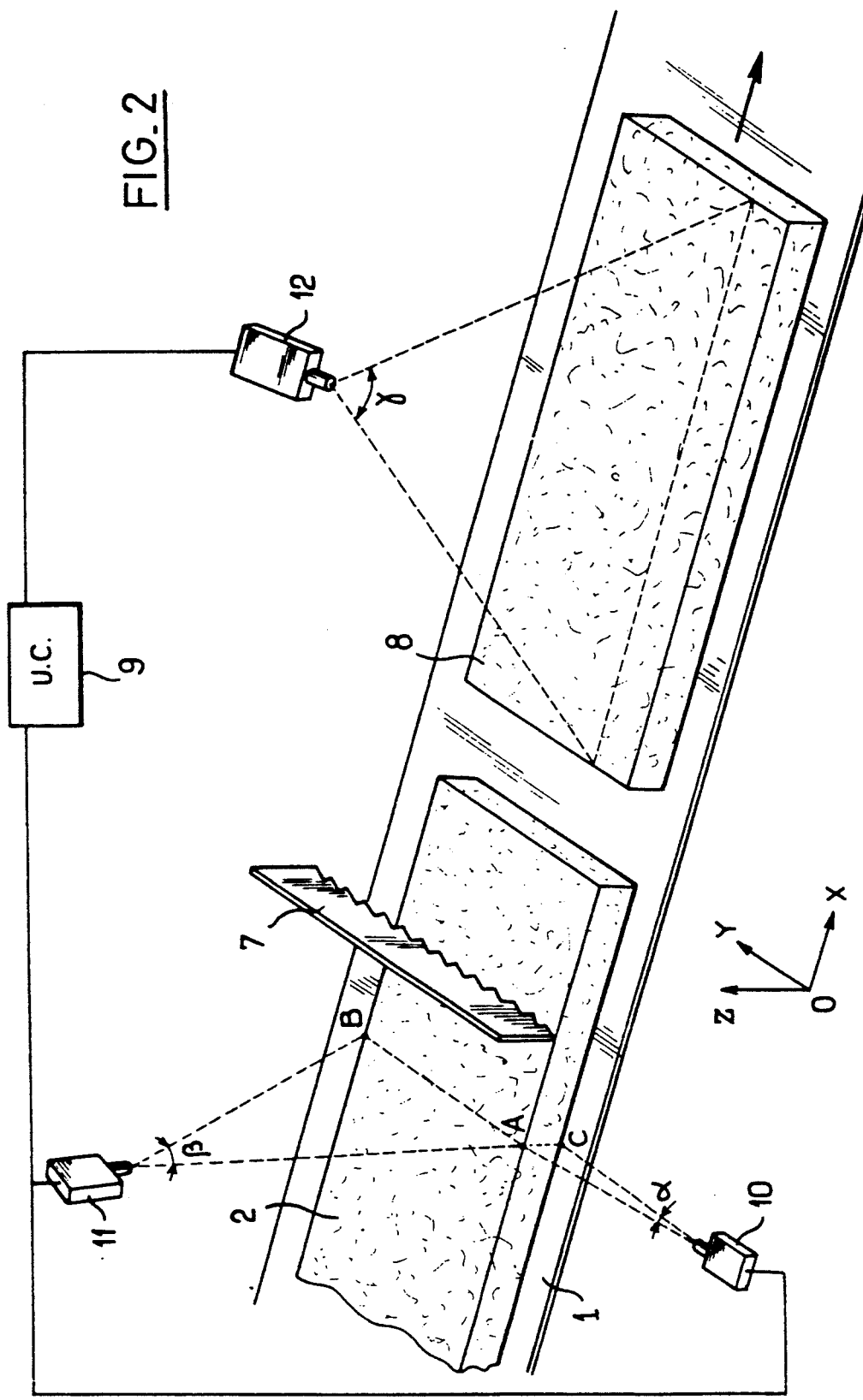

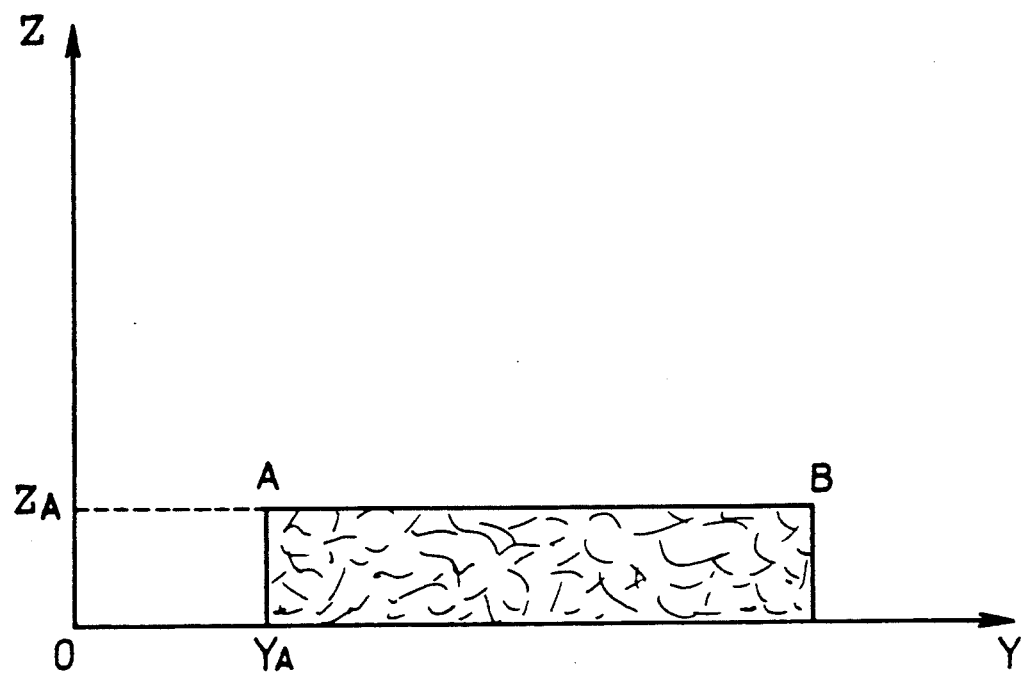
FIG_3
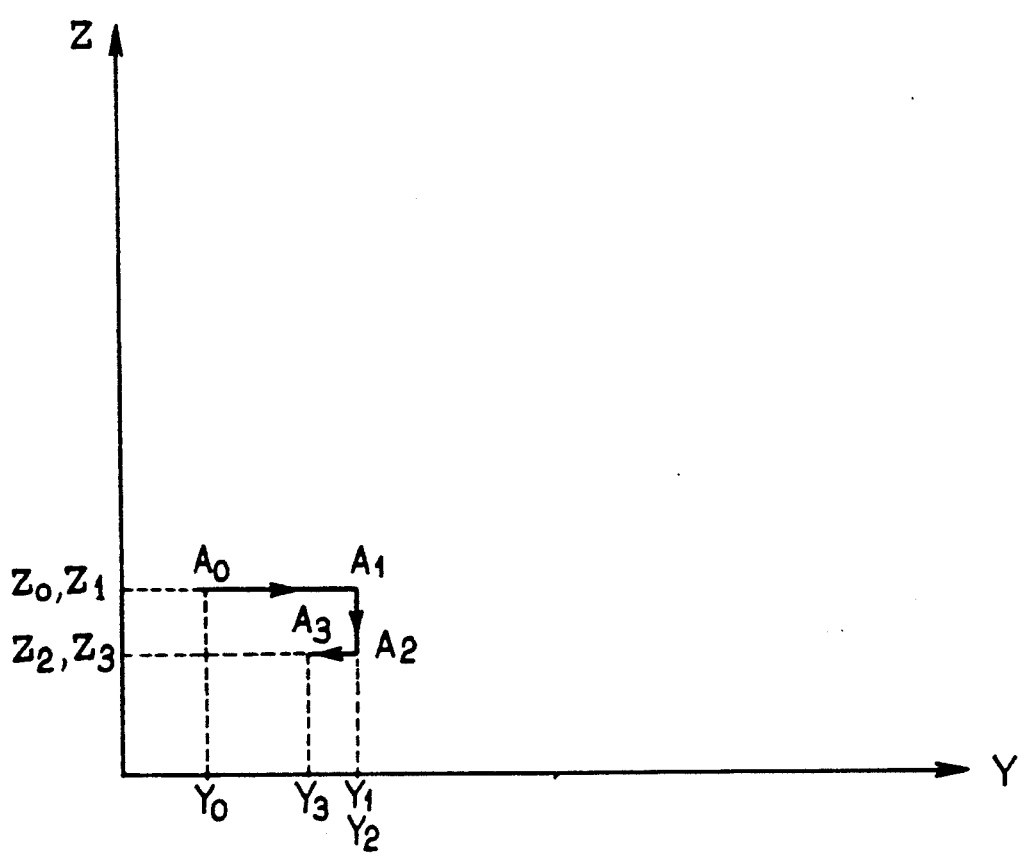
FIG_4

METHOD OF MEASURING THE DIMENSIONS OF MOVING OBJECTS

BACKGROUND OF THE INVENTION

1. Field of the Invention

The invention is concerned with techniques for measuring dimensions and possibly velocity of moving objects, particularly parallelepiped objects passing on a conveyor of a production line.

2. Description of the Related Art

Generally speaking, industry is tending more and more towards automating the manufacture of mass-produced articles. This automation, which makes it possible to achieve highly sustained rates of output, requires the provision of an increasingly accurate monitoring means, particularly for monitoring dimensions of articles during the course of production in order both to decide whether they are to be accepted or rejected and in order to keep an eye on progress on the line.

This monitoring requirement is encountered in the case of the manufacture of insulating panels obtained from mineral wool. After production of the material of which the final panel is constituted, the material passes in the form of a continuous layer on a conveyor while undergoing various processes which include a number of cuts, both longitudinal and transverse, in relation to its axis of travel, so that the end product is panels of usually parallelepiped form, prepared to the desired dimensions. Generally, the order of magnitude of the dimensions is between 1 and 4 meters for the finished length, between 1 and 40 cm for the finished thickness, after compression, and between 0.3 and 2.5 meters for the finished width.

Hitherto, in this field, dimensional measurements were carried out manually and intermittently at the end of the line.

It would be useful to be able to monitor the dimensions and even the velocity at one or a plurality of stages in the cutting program. First of all, this would guarantee that the end products are constant in quality by detecting those which depart from the standards, and by preserving the production "history" of each of the products for a posteriori inspection. In addition, this would make it possible, on a basis of this data, to envisage regulating production such as for example controlling a cutting operation.

Therefore, it is necessary to have continuous measurements without contact in order not to disturb the geometry of the object being measured, and to know the results in real time so that they can be stored and processed.

A visual monitoring device widely used hitherto is the linear camera, referred to as the CCD camera (Charge Coupled Device) comprising a lens and a sensor provided with a bar of juxtaposed photosensitive elements, i.e., pixels. Each pixel receives a quantity of luminous energy and converts it to an electrical charge directly proportional to the intensity of the light received and the exposure time. The desired measurement is obtained in analog form at a given image frequency as a function of the number of pixels "exposed" and the distance separating the camera from the object, which can be digitized for data processing.

As it happens, the aforementioned insulating panels, before or after any one of the cutting operations, follow a path on the conveyor which is normally constituted by at least one rectilinear segment, and which is confined by the conveyor itself. But these panels do not have any predetermined position which is absolutely fixed in relation to the conveyor insofar as they may be variably centered thereon and may be of different sizes. Therefore, these panels do not a fortiori have any predetermined position in relation to any fixed detection device installed in the proximity of the conveyor. Therefore, a conventional CCD camera cannot be used because in order to evaluate the dimensions of an object the position of the camera relative to the object must be exactly known.

SUMMARY OF THE INVENTION

An object of the invention therefore is to provide a method of measurement which employs this type of optical detection device and which makes it possible to continuously determine the dimensions (length, width, thickness) and possibly the speed of the aforementioned moving parallelepiped objects when at the outset neither the exact position in relation to the device(s) for detecting the said parallelepipeds nor their dimensions are known with the desired accuracy.

The above, and other, objects are achieved according to the present invention by an optical method of continuously monitoring the dimensions of a body having a parallelogram cross section and supported on a movable conveyor. A first angular measurement of a first dimension of a first face of the body in a first direction is determined, the first angular measurement being made with respect to a first reference angle at an apex of a first triangular plane having the first dimension as one side thereof. Substantially simultaneously with the step of determining the first angular measurement, a second angular measurement of a second dimension of the second face of the body in a second direction perpendicular to the first direction is determined, the second face intersecting the first face and the second angular measurement being made with respect to a second reference angle at an apex of a second triangular plane coplanar with the first triangular plane and having the second dimension as one side thereof. The first and second dimensions thereby have a common point at a line of intersection of the first and second faces. The position of the common point with respect to one of the first and second directions is then estimated and an iterative process is used to determine the position of the common point. The iterative process is continued until the position of the common point is determined to within a required accuracy in both the first and second directions.

According to a further feature of the invention, the first and second directions are perpendicular to the direction of movement and there are included the subsequent steps of cutting the body in a plane perpendicular to the direction of movement to form at least one panel, and determining the length of the panel in the direction of movement, with respect to a third reference angle at an apex of a third triangular plane having the length as one side thereof.

According to yet a further feature of the invention, each of the steps of determining the first and second angular measurements comprises positioning a lens of a linear CCD camera at a respective one of the apexes.

According to yet a further feature of the invention, the first and second triangles are right triangles having a right angle apex at the common point.

According to yet a further feature of the invention, the process is repeated at a frequency of 100 Hertz.

According to yet a further feature of the invention, a statistical value of the position of the common point is determined from a plurality of determinations, and values of the position of the common point which diverge from the statistical value by more than a predetermined amount are disregarded. The statistical value is determined at a frequency of 1 Hertz.

Preferably, the iterations are carried out on the coordinates of the common point A belonging to the edge common to the two faces of the body, on a basis of an estimation of one of its approximate co-ordinates $Y_0$ and angular measurements ($\alpha$, $\beta$)) of the thickness and width cameras, as follows:

1. The stage of initializing the iterations is carried out with the point $A_n$ of co-ordinates $$\begin{cases} Y_n \\ Z_n = f(Y_n; \alpha) \end{cases}$$

in which n=0

2. Each iteration is then performed, the index n increasing by increments of one unit, by calculation of the co-ordinates of $$A_n: \begin{cases} Y_n = g(Z_{n-1}, \beta) \\ Z_n = Z_{n-1} \end{cases}$$

then of:

$$A_{n+1}: \begin{cases} Y_{n+1} = Y_n \\ Z_{n+1} = f(Y_n, \alpha) \end{cases}$$

3. Then for each calculation of co-ordinates of $A_n$ and $A_{n+1}$ for a fixed value of n, the differences are tested in absolute values:

$$|Y_n - Y_{n-1}| \text{ and } |A_{n+1} - A_n|$$

in relation to the bottom limits $\Delta Y_{min}$ and $\Delta Z_{min}$ imposed, the co-ordinates $Y_A$ and $Z_A$ of A which are retained being the last to have been calculated.

According to the invention, the values of $\Delta Y_{min}$ and $\Delta Z_{min}$ are chosen so that the ratio between the bottom limit $\Delta Y_{min}$ and the mean width of the body to be measured is between 0.5/1000 and 1/1000 and so that the ratio between the bottom limit $\Delta Z_{min}$ and the mean thickness of the body to be measured is between 0.5/1000 and 1/1000.

This method can be applied in cases where the speed of the conveyor is zero.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a perspective view of a line for producing insulating panels, indicating the positioning of the CCD cameras used within the framework of the invention;

FIG. 2 is a perspective view of the apparatus for monitoring the dimensions of the moving panel in accordance with the invention;

FIG. 3 is a graphic projection of the panel in a plane at right angles to its axis of travel;

FIG. 4 is a graphic representation in the same plane as in FIG. 3, showing the successive approximations on the positioning of the edge of the panel.

DETAILED DESCRIPTION OF THE PREFERRED EMBODIMENTS

Figure 5:
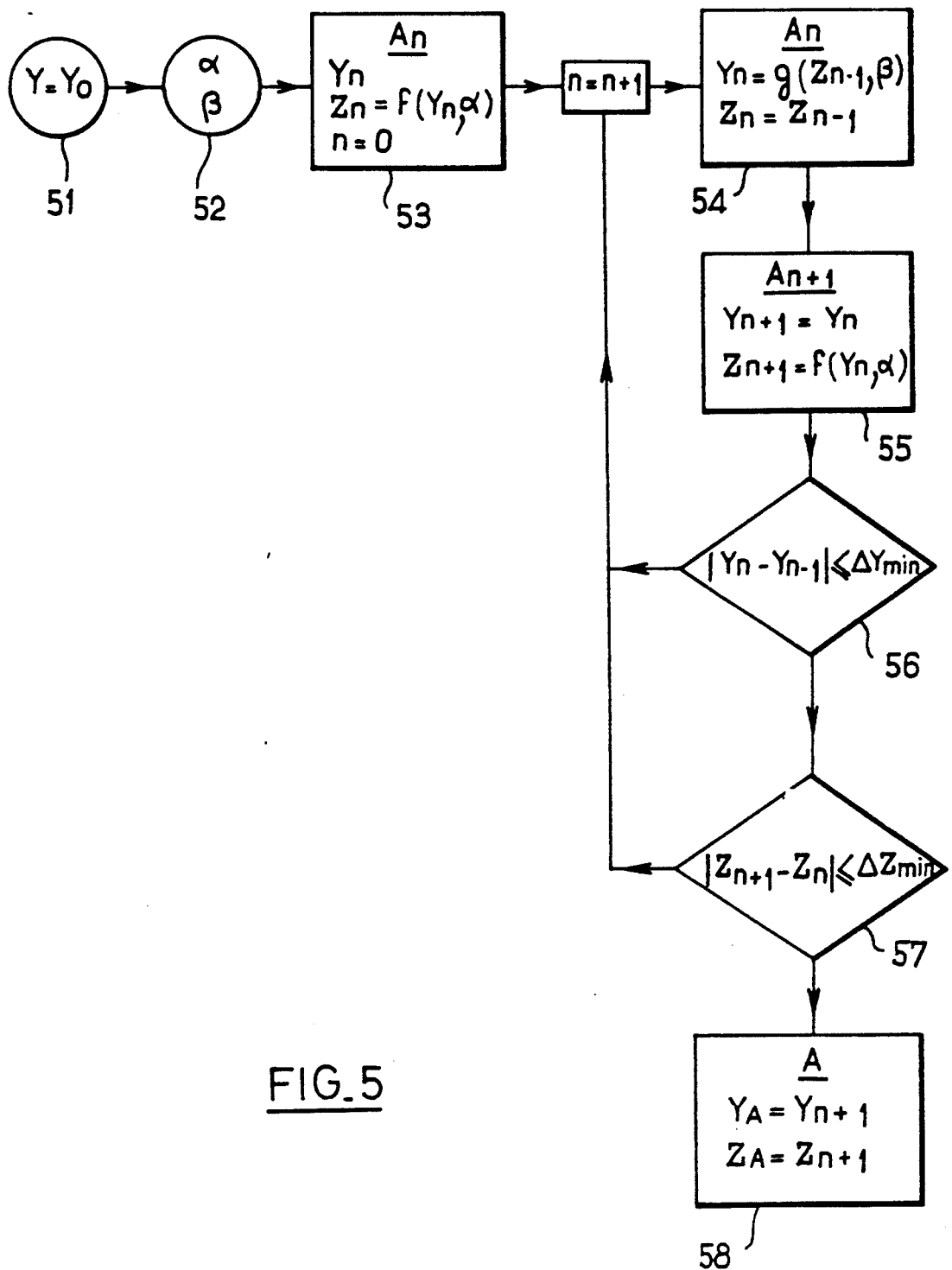
FIG. 5 is a highly simplified flowchart of the method of the invention.

Shown in greatly simplified form in FIG. 1 is an example of a line for producing glass wool panels. It shows the glass wool impregnated with binder and sprayed onto the conveyor 1 and passing in a continuous layer 2 thereon. The layer 2 passes first through an oven 3 which causes cross-linking of the binder. Then the layer 2 undergoes longitudinal cuts in relation to its axis of travel by circular saw blades 4, 5, 6 both in order to obtain sharp edges and to obtain an adequate width for each panel. Then, it is cut transversely in relation to its axis of travel, generally by a guillotine 7 in order finally to obtain panels 8 of the desired dimensions.

Furthermore, FIG. 1 shows where, according to the embodiment illustrated, the optical devices for dimensional measurements are to be placed: three CCD cameras are used, two cameras 10, 11 situated upstream of the guillotine 7 and one, 12, situated downstream of it. The first two, 10, 11, make it possible to respectively measure the thickness and width of the continuous layer 2, the measurements preferably being taken before the transverse cutting operation employing the guillotine 7 in order to avoid having to take into account possible modifications in orientation between the layer 2 and the panels 8 and possible lateral off-centering in relation to the conveyor 1. The third camera 12 measures the length of the panel 8, and so it must be placed downstream of the guillotine 7.

Shown in FIG. 2 in a space identified by the cartesian three-dimensional reference (OXYZ; without respecting the proportions in order to make things clearer), is a panel 8 travelling on a conveyor belt 1, the contact surface between the panel 8 and the conveyor 1 being in the plane (OXY). The axis (OX) is the axis of the rectilinear path and the axis (OY) is at right angles to (OX).

As previously stated, the method employs three linear CCD cameras 10, 11 12 all of which are connected to a data processing unit 9.

One camera measures the thickness of the layer. This is the camera 10 situated in the vicinity of the belt 1 and at the side in order to be able to evaluate the thickness at the "product edge". The right triangular sighting plane (10AC) which contains the camera optical axis, is perpendicular to said "edge" and to the axis of travel of the panel (OX).

Two other cameras 11, 12, situated above the plane (OXY) of the conveyor, make it possible to evaluate the width and the length of the object on its upper face.

The two right triangular sighting planes (11AB and that including camera 12), defined in the same way, are respectively perpendicular to the axis (OX) and to the axis (OY). In the case shown in FIG. 1, the sighting planes of the camera 10 for thickness and/or the camera 11 for width are coincident and meet at the point A.

As was stated previously, these cameras comprise bars of pixels. Thus, the width camera 11 and length camera 12 have relatively wide optical fields and each comprises a bar of 2000 to 3500 pixels. The thickness camera 10, having a more restricted optical field because it measures far smaller dimensions, comprises a bar of approx. 500 pixels. The bars record the number of pixels which have received a certain level of luminous flux.

In the present case, it is pointless to shade the levels of grey. The glass wool panels are light compared with their darker environment. It is therefore sufficient to be able to detect a certain number of "white" pixels associated with the presence of the panel and a certain number of "black" pixels when the camera is only "seeing" the environment.

In practice, each of the cameras 10, 11, 12 delivers at a given image scanning frequency an analog signal representing voltage as a function of time. These signals are then processed as follows: for each signal, a threshold is determined which corresponds to a mean grey level. Around this threshold, each analog signal is binarized to produce a square black/white signal. This binary signal is then digitized in order finally to obtain a certain number of "black" and "white" pixels which make it possible to evaluate the desired dimensions.

The stronger the contrast in light between the panel 8 and its environment, the easier it will be to identify what might be called the pixel "frontier"; that is to say the first "white" pixel which will yield the contours of the object. It may therefore be desirable to place projectors, not shown in Fig. 2, close to the conveyor.

In fact, it is possible to easily correspond the number of "white" and "black" pixels delivered by each camera 10, 11, 12 at a given scanning frequency, after digitization of the analog signal, to respective angles $\alpha$, $\beta$, $\gamma$ which will be conveniently defined here by the term "angles of interception" of the object; that is to say its thickness on the "edge", its width and its length on the upper surface. These angles are at the right angular apexes of the sighting planes and are measured by placing the lenses of the cameras at the respective apexes. It will be these angles of interception which will subsequently be regarded as optical measurements delivered by the cameras, but it is obvious that the process would be the same if reasoning were based on the numbers of pixels.

Taking the example of the thickness camera 10, the number of "white" pixels which make it possible to evaluate the thickness of the panel is associated with its corresponding angle of "interception". For a given thickness, this angle $\alpha$ necessarily varies as a function of the lateral spacing of the panel 8 in relation to the conveyor 1; that is to say as a function of the distance separating the camera 10 from the segment AC of the panel, which can be correlated with the position of the point A situated on the edge of the panel parallel with the axis (OX).

The same situation is encountered when measuring the width and length, since the angles $\beta$, $\gamma$ of the cameras 11, 12 also vary as a function of the distance separating the cameras from the upper surface of the panel, that is to say according to the thickness of the panel, which can be correlated with the positioning of the point A in relation to the axis (OZ).

It goes without saying that the three cameras are, like the plane of the conveyor, fixed and perfectly identified within the three-dimensional reference (OXYZ).

Therefore, the distances between the cameras and the object can be determined simply on a basis of the positioning of the point A belonging to the edge of the object in the two-dimensional reference (OYZ), an edge which in this embodiment, is parallel with the axis of travel (OX).

According to the invention, therefore, the problem of determining the camera: panel distances in space has been reduced to a problem of determining the position of a single point A in space.

A purely geometrical analysis of the problem would make it possible to arrive directly at the co-ordinates $Y_A$ and $Z_A$ of the point A, knowing the pixel frontiers corresponding to the point A. It would suffice to have stored in the memory of the computer all the pairs of values $Y_A$ and $Z_A$ corresponding to the pairs of possible pixel frontiers and calculated on a basis of geometrical analysis of the elements in FIG. 2 in order to directly have the desired coordinates at hand. However, the volume of data to be stored would be enormous and the time required to access the data would be relatively long. That is why the invention proposes a simpler and more rapid method of approximation.

FIG. 3 shows the projection of the panel 8 in the plane (OYZ) with the point A having co-ordinates $Y_A$ and $Z_A$. These are the values which the invention will make it possible to automatically determine with accuracy.

FIGS. 4 and 5 illustrate how to proceed in accordance with the invention.

First of all, the first step 51 consists in estimating a hypothetical value of one of the co-ordinates of A: it is preferably value $Y_O$ along the axis (OY). In fact, the estimation of $Y_O$ may be relatively close to reality because generally one is fairly well aware of the position of the edge of the panel 8 in relation to the edge of the conveyor 1 parallel with it. In the case of a fiber panel, this position is close to that of the circular saw blade 4 or 5 which has trimmed the edges of the continuous layer 2.

Next are the initialization steps 52, 53. On a basis of the angle $\alpha$ given by the thickness camera 10 in step 52 and the assumed value $Y_O$, the processing unit 9 obtains the coordinate $Z_O$ at step 53. This produces a first point $A_O$ in the plane (OYZ) as shown in FIG. 4.

To obtain a more precise point $A_1$, a series of iterations are then carried out in steps 54-55, starting with the value n=1.

Via the processing unit 9, the width camera 11 produces a value associated with the angle $\beta$ of interception of the width, from which one determines the value $Y_1$ at step 54. Thus one can obtain the point $A_1$ ($Y_1$, $Z_1$) such as $$Y_1 = g(Z_O, \beta)$$

$$Z_1 = Z_O.$$

The second iteration is then carried out on the coordinate of A in relation to (OZ): the thickness camera 10, having access to the new value $Y_1$ via the processing unit 9, still with its same angle of interception, makes it possible to evaluate a new thickness. This permits one to calculate a new value for Z. In this way the point $A_2$ is obtained $(Y_2, Z_2)$ such as $$\begin{cases} Y_2 = Y_1 \\ Z_2 = f(Y_1, \alpha) \end{cases}$$

The iterations 54, 55 then continue on the same principle, that is to say raising the index n by one increment at a time, it is possible subsequently to calculate $$A_n \text{ such as} \begin{cases} Y_n = g(Z_{n-1}, \beta) \\ Z_n = Z_{n-1} \end{cases}$$

$$A_{n+1} \text{ such as} \begin{cases} Y_{n+1} = Y_n \\ Z_{n+1} = f(Y_n, \alpha) \end{cases}$$

After each calculation of $A_n$ and $A_{n+1}$ for a given value of n two successive tests 56, 57 are carried out: the difference in absolute value is calculated between the two last coordinates in relation to the axis (OY) and the two last coordinates in relation to the axis (OZ), i.e., $|Y_n - Y_{n-1}|$ and $|A_{n=1} - Z_n|$.

As soon as one or other of these differences is less than or equal to the imposed desired values $\Delta Ymin$ and $\Delta Zmin$ which correspond to the accuracy with which it is desired to know the dimensions to be measured, the iterations are stopped at 58 and the last co-ordinates calculated according to the axes (OY) and (OZ) are retained as co-ordinates of A.

One then has the point A such that $$\begin{cases} Y_A = Y_{n+1} \\ Z_A = Z_{n+1} \end{cases}$$

The desired values are generally around 1 mm. Thus it is normal to require:

$\Delta Ymin = 1 mm$ $\Delta Zmin = 0.5 mm$

Generally, just a few iterations are needed to obtain the desired result. Therefore, this is a particularly advantageous technique for determining a point in a plane, because it is very rapid. As we have noted, obtaining this result without these iterations would require a particularly cumbersome analysis among all the "black" and "white" pixels of the thickness camera 10 and all those of the width camera 11.

Once the point A has been thus identified, it is possible to directly obtain the exact thickness from the knowledge of $\alpha$ and $Y_A$, and the exact width by knowing $\beta$ and $Z_A$.

From this, it is possible to deduce the length from a knowledge of $Z_A$ and the optical measurement $\gamma$ given by the length camera 12.

The three dimensions are determined by this method at a frequency of 100 Hertz. Then all the values thus collected for each dimension at a frequency of 1 Hertz are averaged out, those values which are adjudged aberrations, that is to say which diverge by more than twice the typical divergence $\Delta$ in relation to the mean value calculated at the outset, being disregarded. These "diverging values" are for the most part due to the actual nature of the panel 8 which is of a fibrous texture: indeed, it may happen that some rovings project somewhat beyond the panels and so falsify the measurements.

A new mean value is then recalculated and it constitutes the measurement.

It is possible thus to obtain, in real time, three-dimensional numerical values 11 of the object once every second, knowing that the length camera 12 is capable of measuring the speed of the front edge of the panel.

The measurement of speed is performed, if desired, by calculating the time which the leading edge of the panel takes from entering the field of the camera to arrive at the optical axis of the camera.

This embodiment of the invention is by no means limitative. For example and in particular, it is possible to envisage applying the iterative technique not to the "coupled" determination of the width and the thickness but to that of the length and the thickness. Furthermore, the invention is not necessarily limited to determining the sizes of panels as represented, that is of rectangular parallelepipeds. Indeed, there is nothing to prevent the two surfaces which are perpendicular to the axis of travel being bevelled in the case of a coupled determination of the width and thickness.

Furthermore, taking into account the fact that any optical device, not being ideal, performs measurements which are subject to minor optical distortions, particularly when the object to be measured is remote from the optical axis of the apparatus, the processing unit 9 may take into account these distortions in order to automatically rectify the values measured. In other words, and all the iteration steps would then be conducted on amended values $\alpha'$, $\beta'$ and $\gamma'$.

To facilitate monitoring of dimensions by an operator, it is practical to provide a visual and/or audible alarm to warn the operator that one of the averaged dimensions exceeds the tolerances.

With this deductive technique of measurement which is particularly simple to operate, it is possible to have considerable accuracy to the order of a millimeter, both in real time and in memorizable data, which will then make it possible to subsequently determine where and when a possible problem might occur.

Of course, since the fixed positions of the cameras 10, 11 and 12, and of the conveyor 1, are identified in space (OXYZ), one has a means of measuring panels 8 in an entirely automated fashion. This avoids any tiresome manual adjustment of the measuring means as a function of the panel produced, since the invention makes it possible to adapt the measurement to any dimension and any centering of the panels, without any disturbance of contact with the panels.

This camera-processing unit system is flexible in its configuration: for example, the cameras can be placed at the level of the stage entailing the transverse cut by a guillotine 7, the length/speed camera 12 advantageously controlling the fall of the cutter blade by servo control, as it is placed just downstream thereof.

If the width camera 11 is placed upstream of the guillotine at the level of the longitudinal cutting means, it may be adapted to be capable of measuring a plurality of widths at the same time, where the panels which have just been cut longitudinally are separated by spacers leaving sufficiently wide spaces between the panels that the camera can detect them, the panels remaining parallel with the axis of travel (OX).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of The United States Is:

1. An optical method of continuously monitoring the dimensions of a body having a parallelogram cross-section and supported on a movable conveyor in a line for producing insulating mats, comprising the steps of:
   determining a first angular measurement of a first dimension of a first face of the body in a first direction, said first angular measurement being made with respect to a first reference angle at an apex of a first triangular plane having said first dimension as one side thereof;
   substantially simultaneously with the step of determining the first angular measurement, determining a second angular measurement of a second dimension of a second face of the body in a second direction perpendicular to said first direction, said second face intersecting said first face and said second angular measurement being made with respect to a second reference angle at an apex of a second triangular plane coplanar with said first triangular plane and having said second dimension as one side thereof whereby said first and second dimensions have a common point at a line of intersection of said first and second faces;
   estimating the position of said common point with respect to one of said first and second directions;
   using an iterative process to determine the position of said common point;
   continuing said iterative process until the position of said common point is determined to within a required accuracy in both of said first and second directions, wherein each of said steps of determining said first and second angular measurements comprises positioning a lens of a linear CCD camera at a respective said apex,
   wherein said first and second directions are perpendicular to the direction of the movement, including the subsequent steps of:
   cutting said body in a plane perpendicular to the direction of movement to form at least one panel; and
   determining the length of said panel in the direction of movement, as a third angular measurement made with respect to a third reference angle at an apex of a third triangular plane having said length as one side thereof.

2. The method of claim 1 wherein said body is substantially a rectangular parallelepiped.

3. The method of claim 2 wherein each of said first and second triangles is a right triangle having a right angular apex at said common point.

4. The method of claim 1 wherein said steps are repeated at a frequency of 100 Hz.

5. The method of claim 1 including the subsequent steps of:
   repeating said determining, estimating, using and continuing steps to produce plural determinations of the position of said common point;
   determining a statistical value of said position of the common point from said plural determinations; and
   disregarding produced values of the position of the common point which diverge from the statistical value by more than a predetermined amount.

6. The method of claim 5 wherein said statistical value is determined at a frequency of 1 Hz.

7. The method of claim 1 wherein $\alpha$ and $\beta$ are said first and second angular measurements, Y and Z are said first and second directions, A is the common point and $Y_O$ is an estimate of the position of said common point with respect to the Y direction, wherein said step of using an iterative process to determine the position of said common point comprises the steps of:
   initializing the iterative process of a point $A_n$ for $Y_n$, where $n=0$ and $Z_n=f(Y_n, \alpha)$;
   performing a series of iterations while incrementing n by one unit, wherein for each $A_n$, $Y_n=g(Z_{n-1},\beta)$ and $Z_n=Z_{n-1}$, and for each $A_{n+1}$, $Y_{n+1}=Y_n$ and $Z_{n+1}=f(Y_n, \alpha)$;
   and wherein said continuing step comprises, for each iteration, testing $|Y_n-Y_{n-1}|$ and $|A_{n+1}-Z_n|$ against $\Delta Y min$ and $\Delta Z min$, respectively, wherein $\Delta Y min$ and $\Delta Z min$ are said required accuracies in said first and second directions.

8. The method of claim 7 wherein a ratio between one of $\Delta Y min$ and $\Delta Z min$ and a respective dimension of the body in the Y and Z directions is between 0.5/1000 and 1/1000.

9. The method of claim 1 wherein said conveyor is stationary.

10. An optical method of continuously monitoring the dimensions of a body having a parallelogram cross-section and supported on a movable conveyor in a line for producing insulating mats, comprising the steps of:
    determining a first angular measurement of a first dimension of a first face of the body in a first direction, said first angular measurement being made with respect to a first reference angle at an apex of a first triangular plane having said first dimension as one side thereof;
    substantially simultaneously with the step of determining the first angular measurement, determining a second angular measurement of a second dimension of a second face of the body in a second direction perpendicular to said first direction, said second face intersecting said first face and said second angular measurement being made with respect to a second reference angle at an apex of a second triangular plane coplanar with said first triangular plane and having said second dimension as one side thereof, whereby said first and second dimensions have a common point at a line of intersection of said first and second faces;
    estimating the position of said common point with respect to one of said first and second directions;
    using an iterative process to determine the position of said common point;
    continuing said iterative process until the position of said common point is determined to within a required accuracy in both of said first and second directions,
    wherein said first and second directions are perpendicular to the direction of movement, including the subsequent steps of:
    cutting said body in a plane perpendicular to the direction of movement to form at least one panel; and determining the length of said panel in the direction of movement, as a third angular measurement made with respect to a third reference angle at an apex of a third triangular plane having said length as one side thereof.

11. The method of claim 10 wherein $\alpha$ and $\beta$ are said first and second angular measurements, Y and Z are said first and second directions, A is the common point and $Y_O$ is an estimate of the position of said common point with respect to the Y direction, wherein said step of suing an iterative process to determined the position of said common point comprises the steps of;

initializing the iterative process of a point $A_n$ for $Y_n$, where n=0 and $A_n=F(Y_n, \alpha)$;

performing a series of iterations while incrementing n by one unit, wherein for each $A_n$, $Y_n=g(X_{n-1}, \beta)$ and $Z_n=A_{n-1}$, and for each $A_{n+1}$, $Y_{n+1}=Y_n$ and $Z_{n+1}=F(Y_n, \alpha)$;

and wherein said continuing step comprises, for each iteration, testing $|Y_n=Y_{n-1}|$ and $|Z_{N+1}-A_n|$ against $\Delta Y min$ and $\Delta Z min$, respectively, wherein $\Delta Y min$ and $\Delta Z min$ are said required accuracies in said first and second directions.

12. The method of claim 10 including the step of controlling said cutting step as a function of the measured length of the panel.

13. An optical method of continuously monitoring the dimensions of a body having a parallelogram cross-section and supported on a movable conveyor in a line for producing insulating mats, comprising the steps of:

determining a first angular measurement of a first dimension of a first face of the body in a first direction, said first angular measurement being made with respect to a first reference angle at an apex of a first triangular plane having said first dimension as one side thereof;

substantially simultaneously with the step of determining the first angular measurement, determining a second angular measurement of a second dimension of a second face of the body in a second direction perpendicular to said first direction, said second face intersection said first face and said second angular measurement being made with respect to a second reference angle at an apex of a second triangular plane coplanar with said first triangular plane and having said second dimension as one side thereof, whereby said first and second dimensions have a common point at a line of intersection of said first and second faces;

estimating the position of said common point with respect to one of said first and second directions;

using an iterative process to determined the position of said common point;

continuing said iterative process until the position of said common point is determined to within a required accuracy in both of said first and second directions; and cutting the body to form a panel.

* * * * *